Jan. 11, 1966  J. H. LITTLE ET AL  3,229,293

FOUR ARM SPIRAL ANTENNA DIRECTION FINDER

Filed July 18, 1963  2 Sheets-Sheet 1

INVENTORS
JULIUS A. KAISER
& JOHN H. LITTLE

BY *Harry M. Saragovitz,*
*Edward J. Kelly,*
*Herbert Berl &*
*J. P. Edgerton*

ATTORNEYS.

INVENTORS
JULIUS A. KAISER
& JOHN H. LITTLE

United States Patent Office 3,229,293
Patented Jan. 11, 1966

3,229,293
FOUR ARM SPIRAL ANTENNA DIRECTION FINDER
John H. Little, Oxnard, Calif., and Julius A. Kaiser, Kensington, Md., assignors to the United States of America as represented by the Secretary of the Army
Filed July 18, 1963, Ser. No. 296,141
4 Claims. (Cl. 343—113)
(Granted under Title 35, U.S. Code (1952), sec. 266)

The invention described herein may be manufactured and used by or for the Government of the United States of America for governmental purposes without the payment to us of any royalty thereon.

This invention relates to the field of direction finders and more particularly to a passive direction finder utilizing a spiral antenna.

In the field of electronic communications there are many occasions on which it is necessary to know the azimuthal direction to a signal source. Such a need arises in the fields of air traffic control, navigation, military electronic countermeasures, and missile tracking to name a few. Several types of direction finders currently exist among which are rotatable loop antennas and Adcock antennas; pairs of mutually perpendicular antennas connected to a goniometer; and dual antenna lobe switching systems. All of these systems require some physically rotating element, usually the antenna, and most of them have inherent 180° directional ambiguities. In addition, the lobe switching systems require substantial active switching circuitry.

For most applications, there would be considerable advantages in having a direction finder which is stationary and which provides unambiguous directional information over a full 360°. Such a system would be inherently more useful and less complex than the previously-mentioned prior art systems since both mechanical rotating equipment and auxiliary ambiguity resolving circuits would be eliminated.

It is therefore an object of this invention to determine the direction of origin of a signal through the utilization of stationary means.

It is another object of this invention to obtain directional information in a device having a no directional ambiguity and which is sensitive to signals emanating from any direction.

It is still another object of this invention to obtain directional information in a system having a minimum of active components.

Still another object of this invention is to achieve signal source directional information in a system which is extremely simple, rugged and reliable.

Yet another object of this invention is to obtain directional information in a system containing a spiral antenna.

These and other objects, advantages, and features of this invention will become more apparent from the following description taken in connection with the drawings in which:

FIGS. 1b and 1c are diagrams showing relations between the various input signals to the terminals of the antenna of FIG. 1a;

Figure 2A:
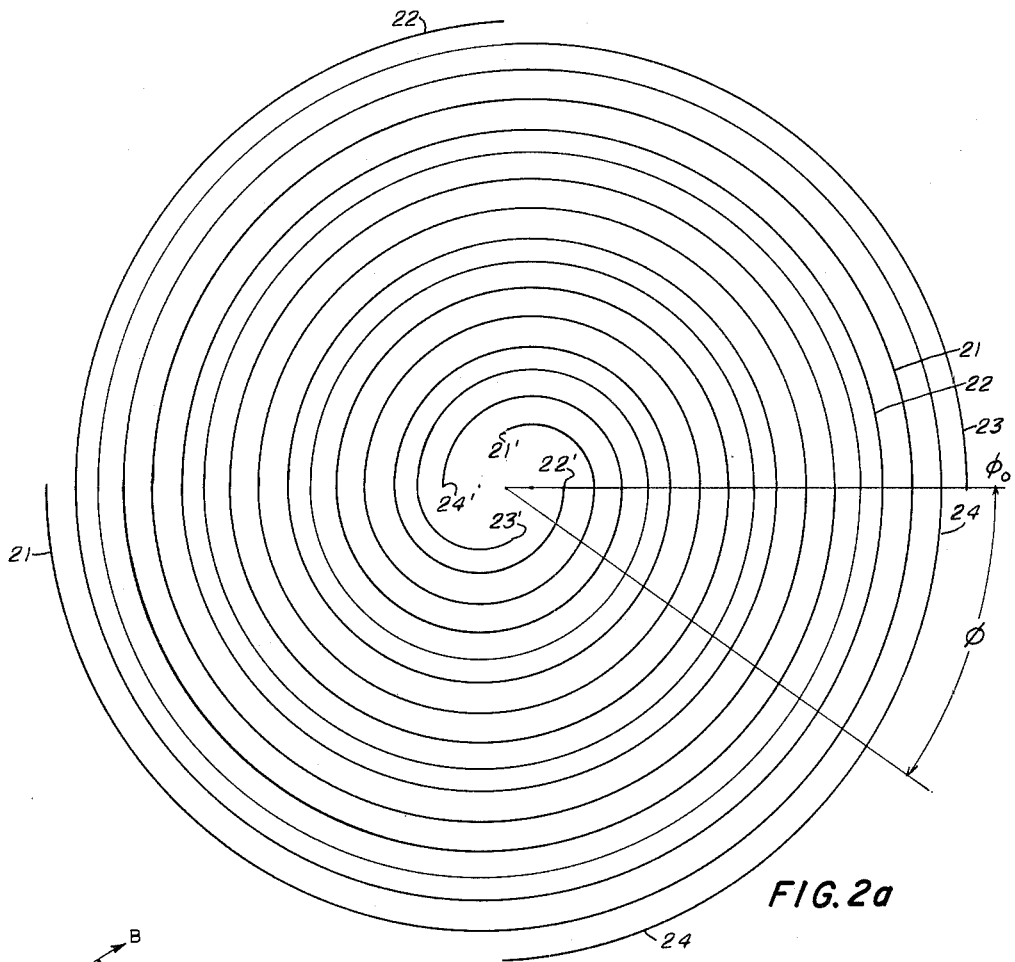
FIG. 2a is a pictorial representation of a four-filament spiral antenna forming a part of the preferred embodiment of this invention.
Figure 2B:
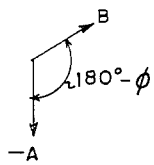
Figure 2C:
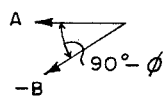
Figure 2D:
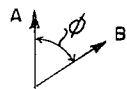
Figure 2E:
Figure 3:
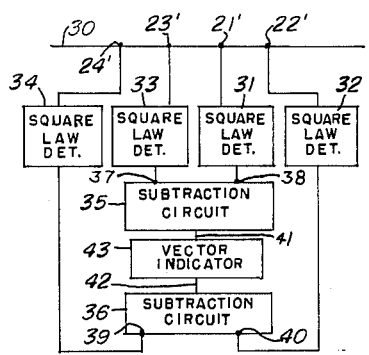

FIGS. 2b, 2c, 2d, and 2e show the relations between the various input signals to the antenna of FIG. 2a; and FIG. 3 is a block diagram of a system representing a preferred embodiment of this invention.

Figure 1A:
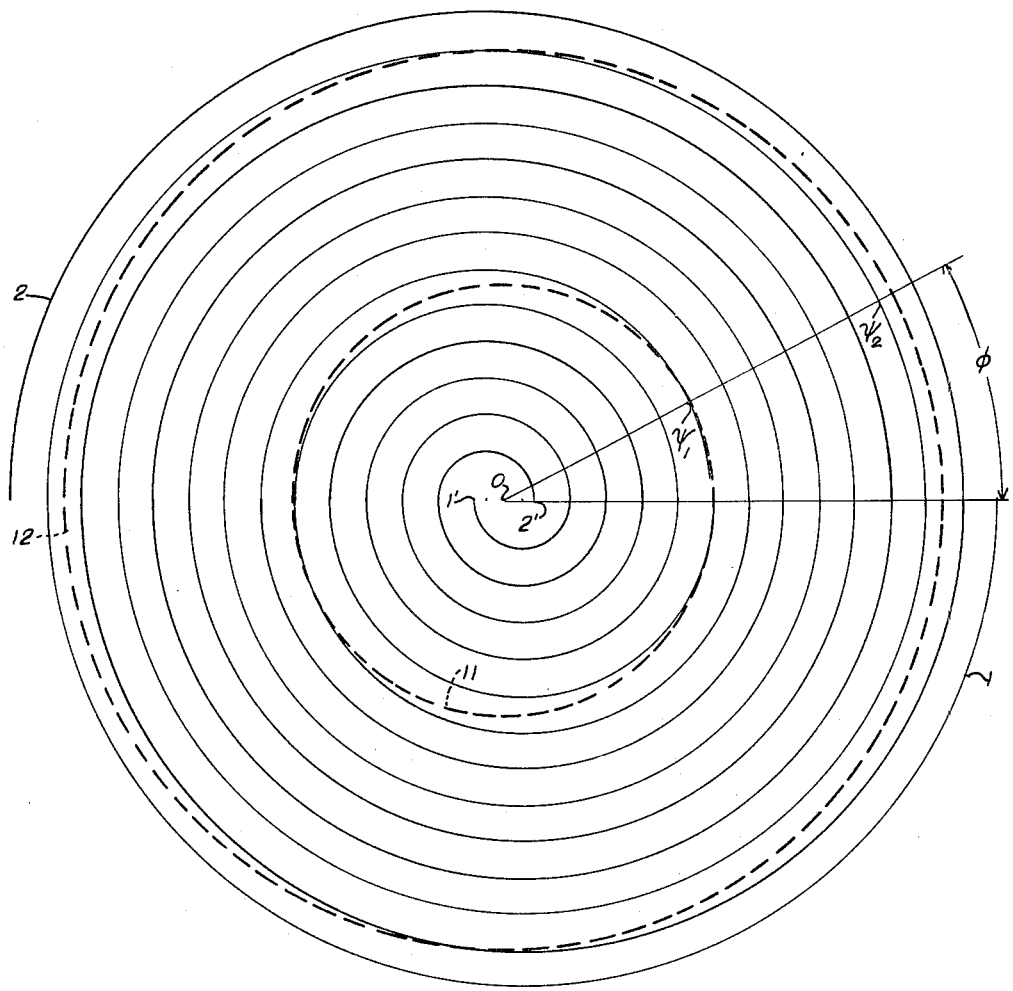
FIG. 1a is a pictorial representation of a two-filament spiral antenna.

FIG. 1 shows a pictorial representation of a two-filament spiral antenna, which is the basic component of the preferred embodiment of this invention. When the spiral antenna of FIG. 1a is placed in the radiation field of a signal source and in a horizontal plane, parallel and adjacent to a ground plane, voltages will be introduced at its terminals 1' and 2'. The relation between these induced voltages and the direction from which the radiation is coming can best be determined by an investigation of the radiation pattern of the antenna of FIG. 1a when used as a transmitting antenna followed by an application of the Rayleigh-Carson reciprocity theorem to determine the receiving properties of the antenna.

If the terminals 1' and 2' of the antenna are excited with anti-phase signals A and A', respectively, these signals will travel outward along their respective filaments 1 and 2 until reaching some region where the signals on adjacent filaments are in phase. In this region radiation will be produced. Since the signals were intially anti-phase, this in phase condition will occur when the signal on one filament has traveled one half of a wavelength further than the signal on the adjacent filament. Since the filaments are identical in shape and one filament is rotated 180° around the origin O with respect to the other, and further since any 180° segment of filament approximates a circle having its center at the origin O, signals on adjacent filament will be in phase in a region where a 180° arc of filament has a length approximately equal to one-half of the wavelength of the signal.

This phenomenon can be visualized by imagining the filament 1 to be rotated 180° about the origin O so that it would be superimposed on the filament 2. If the inputs to the two filaments are then excited with anti-phase signals, the signals will travel outward along their respective filaments and the signals on adjacent elements will always remain 180° out of phase. However, when the signals reach a point where a semicircular segment of filament has a length of $\lambda/2$, the signal on filament 1 will be exactly in phase with the signal 180° away on filament 2. Therefore, if the filament 2 were to be rotated back to the position shown in FIG. 1a adjacent filament elements at the one wavelength circumference would have signals which are in phase with each other.

In a like manner, when in phase signal are applied to the input terminals 1' and 2' they will become anti-phase at the one wavelength circumference, thus suppressing radiation, but would again be in phase at the two wavelength circumference. The one wavelength circumference is indicated in FIG. 1a by the dotted line 11 and the two wavelength circumference is indicated by the dotted circle 12. To summarize, when anti-phase signals are inserted on the input terminals of the antenna, radiation occurs at the one wavelength circumference 11 and when in phase signals are applied to the input terminals radiation occurs at the two wavelength circumference 12.

Since the signals on the filaments are traveling outward with a finite velocity, there is a definite time phase variation as the signals make one rotation around the spiral. For example, when radiation is occurring at the one wavelength circumference there is a 360° signal phase shift around the circumference, or in other words, a particular signal element travels around the circumference in a time equal to the period of one cycle of the signal. Similarly, a signal radiating from the two-wavelength circumference has a 720° phase shift around the circle 12. Along any radial the phase of a signal radiating from the one wavelength circumference may be represented by the equation:

$$\alpha_1 = \alpha_{\text{input}-1\text{st}} + \frac{2\pi}{\lambda L_1} \quad (1)$$

where $\alpha$, equals the phase of the signal at the radial $\phi$, $\phi$ equals the angle between the radial and the reference radial $\phi_0$, as shown in FIG. 1a, $\alpha_{\text{input}-1\text{st}}$ represents the phase of the signal at the input terminal, and $L_1$ equals the length of one filament from its input terminal to the point of intersection with the radial $\phi$. This length $L_1$ can be represented in terms of the radial travel of a signal (assuming the input terminals to be at the origin O) by the expression:

$$L_1 = \frac{a\psi_1^2}{2} \qquad (2)$$

where $a$ is a constant which determines the pitch of the spiral and $\psi_1$ is the total radian measure along the path of one spiral from the origin O.

The phase $\alpha_2$ of a signal around the circumference 12, resulting from in phase inputs, can be represented in a like manner as:

$$\alpha_2 = \alpha_{\text{input-2nd}} + \frac{L_2}{\lambda} \cdot 2\pi \qquad (3)$$

where $\alpha_{\text{input-2nd}}$ is the phase of the in phase input signals and $L_2$ is the length along the spiral from the origin O to the point where the spiral intercepts the radial $\phi$ in the vicinity of the two-wavelength circumference. The length $L_2$ may be represented by the equation:

$$L_2 = \frac{a\psi_2^2}{2} \qquad (4)$$

where $\psi_2$ is the total radian measure of the path of the spiral from the origin O to the point on the radial $\phi$ nearest the two-wavelength circumference.

If the input terminals 1' and 2' were to be excited simultaneously with in phase and anti-phase inputs, radiation would occur simultaneously from both the one wavelength circumference 11 and the two wavelength circumference 12. The difference in phase between the two radiated signals along any radial $\phi$ can be determined by subtracting Equation 1 from Equation 3. This produces the relation:

$$\alpha_1 - \alpha_2 = (\alpha_{\text{input-1st}}) - (\alpha_{\text{input-2nd}}) + \frac{2\pi}{\lambda}(L_1 - L_2) \qquad (5)$$

If the two inputs have the same frequency, the phase $\alpha_{\text{input-1st}}$ changes at the same rate as the phase $\alpha_{\text{input-2nd}}$ so that the difference between these two phases is always constant. Therefore, the difference in phase between the two radiated signals along any radial varies as the difference between the path lengths varies and is equal to zero when:

$$(\alpha_{\text{input-1st}}) - (\alpha_{\text{input-2nd}}) = \frac{a\pi}{\lambda}(\psi_2^2 - \psi_1^2) \qquad (6)$$

It has been found that radiation from the spiral antenna along any radial, when the antenna is producing radiation at both the one-wavelength circumference and the two-wavelength circumference is proportional to the vector sum of the two radiation signals along the radial. This means that the radiation will be a maximum along the radial $\phi_{\max}$ where $\alpha_1 - \alpha_2$ equals zero, since it is along this radial that the two signals are in phase. The radiation produced at the one-wavelength circumference is known as the first mode radiation and that along the two-wavelength circumference is referred to as the second mode radiation.

The relation between the direction of maximum radiation $\phi_{\max}$ and the phase difference between the anti-phase, or first mode, input signal and the in-phase, or second mode, input signal can be determined by an inspection of Equations 1 and 3. These equations show that the difference between the two terms on the right side of Equation 6 is directly proportional to the difference between the phases of the first and second mode input signals multiplied by a constant which is determined by the geometry of the antenna. Therefore, the azimuthal direction of maximum radiation is a single-valued function of the phase angle between the vectors representing the two pairs of inputs signals. The relations between the input signals are shown in FIGS. 1b and 1c.

Figure 1B:
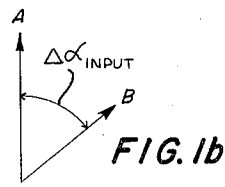

FIG. 1b shows the relation between the two input signal components to terminal 1' of the spiral antenna. The vector A represents the component of the anti-phase input signal and the signal B represents the component of the in-phase signal. These vectors have an angle between them which is denoted by $\Delta\alpha_{\text{input}}$. This angle is equal to:

$$(\alpha_{\text{input-1st}}) - (\alpha_{\text{input-2nd}}) \qquad (7)$$

Figure 1C:
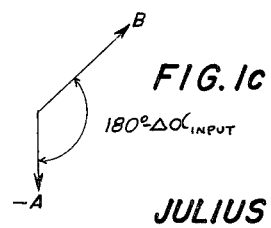

FIG. 1c shows the relation between the inputs to terminal 2'. In this figure the vector B is shown to be in phase with the similarly labeled vector of FIG. 1b, since it represents the component of the in phase input signal, while the vector −A is 180° out of phase with respect to the vector A of FIG. 1b, since −A represents the anti-phase signal component of the total signal applied to terminal 2'.

Due to the fact that the radian measures $\psi_1$ and $\psi_2$ both exist along the same radial $\phi$ the following relation exists between them:

$$\psi_2 = \psi_1 + 2n\pi \qquad (8)$$

where $n$ is the number of turns of spiral between the point $\psi_1$ on the spiral near the one wavelength circumference and the point $\psi_2$ near the two wavelength circumference. Substituting Equations 7 and 8 into Equation 6 produces the following equation:

$$\Delta\alpha_{\text{input}} = \frac{a\pi}{\lambda}(\psi_1^2 + 4n\pi\psi_1 + 4n^2\pi^2 - \psi_1^2) \qquad (9)$$

or, $$\Delta\alpha_{\text{input}} = \frac{4na\pi^2}{\lambda}(\psi_1 + n\pi) \qquad (10)$$

Further, the radius R to any point on the spiral is equal to $a\psi$ and the radius to the point where one filament of the spiral intercepts the one wavelength circumference is equal to $$\frac{\lambda}{2\pi a}$$

The distance around one turn of the spiral at the one wavelength circumference can be considered to be circular so that the expression for $\psi_1$ around the one wavelength circumference can be given by the expression:

$$\psi_1 = \frac{\lambda}{2\pi a} + \phi \qquad (11)$$

where $\phi$ is measured with respect to $\phi_0$. Substitution of Equation 11 into Equation 10 produces the following result:

$$\Delta\alpha_{\text{input}} = \frac{4na\pi^2}{\lambda}\left(\frac{\lambda}{2\pi a} + \phi + n\pi\right) \qquad (12)$$

By a judicious choice of the values of $n$ and $a$ for a given wavelength, Equation 12 can be simplified to:

$$\Delta\alpha_{\text{input}} = \phi + 3n\pi \qquad (13)$$

With such an antenna, the direction of maximum radiation will be directly determined by the phase difference $\Delta\alpha_{\text{input}}$ between the input signals.

Since the simultaneous application of a first mode input signal and a second mode input signal to the spiral antenna of FIG. 1a will produce maximum radiation in a single azimuthal direction, the Rayleigh-Carson reciprocity theorem tells us that when the antenna of FIG. 1a is operating as a receiving device a signal emanating from a particular direction will produce in phase signal components and anti-phase signal components at terminals 1' and 2', which components will have a particular phase difference. It should also be noted that, since $\Delta\alpha_{\text{input}}$ is equal to the direction of origin of the received radiation, if the received signal is maintained in a fixed position and the antenna is rotated by 90°, the phase angle between the two signal components appearing at each of the antenna terminals will also be varied by 90° with respect to the phase differences prior to rotation. This fact is utilized in the present invention to produce an unambiguous indication of the direction of origin of a received signal. Specifically, the device of the present invention utilizes two spiral antennas, each of which is similar to that of FIG. 1a, with one antenna rotated by 90° with respect to the other antenna. The signals then appearing on the four output terminals (these terminals have previously been described as input terminals when the antenna was considered to be a radiating device) will uniquely define the direction of origin of the received signal.

The antenna used in the preferred embodiment of the present invention is shown pictorially in FIG. 2a. This antenna consists of two antennas identical to that of FIG. 1a, the elements 22 and 24 comprising one filament pair and the elements 21 and 23 comprising the second pair, the latter pair being rotated by 90° with respect to the former.

In FIG. 1a the one wavelength circumference was assumed to intersect the filament 1 along the radial $\phi_0$. Therefore, if the antenna had the dimensions assumed in Equation 13, the phase angle $\Delta\alpha_{input}$ between the two input components to terminal 1' would be equal to the angle $\phi_{max}$, the direction of maximum radiation with respect to $\phi_0$, or to $\phi_{max}-180°$ depending on whether $n$ is an even or odd integer. Conversely, according to the reciprocity theorem, and depending again on the nature of $n$, when the antennas of FIG. 1a is operating as a receiving antenna the phase difference between the two components of the signal appearing at terminal 1' would be equal to the direction of origin of the received signal with respect to $\phi_0$ or to 180° minus that angle. It is also obvious from an inspection of FIG. 1c that the angle between the signal components appearing at terminal 2' will differ from that at terminal 1' by 180°.

These relations describe the signals appearing at terminals 22' and 24' of FIG. 2a. Further, since the filaments 21 and 23 of FIG. 2a have been rotated by 90° with respect to filaments 22 and 24 the phase angles between the signal components appearing at terminals 21' and 23' will vary by 90° from those appearing at terminals 22' and 24', respectively. FIGS. 2b through 2e show the relations between the two signal components appearing at the four terminals for the case where $n$ of Equation 13 is even.

FIG. 2b shows the relations between the vectors of the signal components appearing at terminal 22'. As would be expected, since the filament 22 is identical with the filament 2 of FIG. 1a, except for the fact that the filaments of FIG. 2a are wound in the opposite sense from those of FIG. 1a, the relation between the vectors of the signal components appearing at terminal 22' is identical with that of the signal components shown in FIG. 1c. The opposite rotation of the spirals of FIG. 2a produces no difference in operation over the device of FIG. 1a and they are merely drawn in this manner to show that the choice of spiral sense has no effect on operation. FIG. 2c shows the relation between the signal components appearing at terminal 21'. Since the spiral 21 has been rotated by 90° with respect to spiral 22 the vector representing the components of the first radiation mode signal A, has been rotated by 90° but the vector $-B$ representing the input from the second mode antenna pattern has been rotated by 180° because signals in the second mode go through a 720° phase shift while traveling once around the two wavelength circumference. Therefore, the phase angle between the two signal components appearing at terminal 21' is equal to $90°-\phi$. Similarly, FIG. 2d shows the relation between signal components appearing at terminal 24' and, as is the case at the terminal 1' of FIG. 1a, they have a phase angle between them equal to $\phi$. Finally, the signals appearing at terminal 23' have a phase angle between them to equal to $90°+\phi$, or 180° minus the phase angle appearing at terminal 21'.

The vector sum of the signal components appearing at terminals 21', 22', 23' and 24', may be represented by the following equations:

$$V_{21'} = A + B \cos(90° - \phi) = A + B \sin\phi \quad (14)$$
$$V_{22'} = A + B \cos(180° - \phi) = A - B \cos\phi \quad (15)$$
$$V_{23'} = A + B \cos(90° + \phi) = A - B \sin\phi \quad (16)$$
$$V_{24'} = A + B \cos\phi \quad (17)$$

If these voltages were each squared, as would be the result if they were each applied to a square law detector, the outputs of the detectors could be represented by the following equations:

$$\overline{V}_{21'}^2 = \tfrac{1}{2}(A^2 + 2AB \sin\phi + B^2 \sin^2\phi) \quad (18)$$
$$\overline{V}_{22'}^2 = \tfrac{1}{2}(A^2 - 2AB \cos\phi + B^2 \cos^2\phi) \quad (19)$$
$$\overline{V}_{23'}^2 = \tfrac{1}{2}(A^2 - 2AB \sin\phi + B^2 \sin^2\phi) \quad (20)$$
$$\overline{V}_{24'}^2 = \tfrac{1}{2}(A^2 + 2AB \cos\phi + B^2 \cos^2\phi) \quad (21)$$

Equations 18 to 21 represent the results of squaring the R.M.S. values of the detector input signals. It will be appreciated that if peak detection were used the terms on the right hand sides of these equations would be doubled. All of the detectors herein described are of the time-averaging type. Subtraction of voltage $\overline{V}_{23'}^2$ from voltage $\overline{V}_{21'}^2$ will produce a signal which is equal to $2AB \sin\phi$, while subtraction of voltage $\overline{V}_{22'}^2$ from $\overline{V}_{24'}^2$ will produce a signal which is equal to $2AB \cos\phi$.

The amplitudes and polarities of these two difference voltages uniquely define the direction of origin of a received signal with no ambiguity over 360°. This is due to the fact that the expression $2AB \sin\phi + j2AB \cos\phi$ is a single valued function over that range. These two signals could be applied to some orthogonal indicator in order to obtain an unambiguous indication of the direction of signal origin. For example, a cathode ray tube would be suitable if the difference signals were applied to respective ones of its orthogonal deflection plates. Similarly, an X–Y recorder could be used.

FIG. 3 shows a block diagram of one form which the signal processing circuitry of the present invention could take. In this figure the element 30 represents a side view of the receiving antenna of FIG. 2a. The terminals 21' to 24' represent the similarly numbered antenna output terminals of FIG. 2a. The signals present at these terminals are each applied to a respective square law detector 34, 33, 31, and 32. These square law detectors may be of any well-known type, such as a grid leak detector, diode detector, or power detector, and they may include suitable amplifying means, if needed. The detectors are biased so as to produce outputs which are proportional to the square of the R.M.S. voltage inputs. The outputs of outputs of detectors 32 and 34 are applied to terminals 37 and 38, respectively, of substraction circuit 35 and the outputs of detectors 32 and 34 are applied to terminals 40 and 39, respectively, of subtraction circuit 36. These subtraction circuits could be of any well-known type, such as combinations of inverters and summing amplifiers. The outputs of the subtraction circuits are conducted to the orthogonal inputs of vector indicator 43 over conductors 41 and 42. The vector indicator 43 could be of any of the types previously discussed.

An alternative circuit could be used which would eliminate the subtraction circuits 35 and 36. If the outputs of the square law detectors are of sufficient amplitude, and if the vector indicator 43 were of the type which was responsive to the difference between two inputs to one orthogonal axis, the subtraction circuits 35 and 36 could be eliminated. For example, if the indicator 43 were a cathode ray tube of the electrostatic deflection type, the outputs of square law detectors 32 and 34 could each be applied to a different one of the horizontal deflection plates and the outputs of detectors 31 and 33 could each be applied to a different one of the vertical deflection plates. If it were desired to have a cathode ray the produce a line indicating the direction of origin of the received signal it would only be necessary to apply modulating voltage to the two pairs of inputs.

It will be apparent that the embodiments shown are only exemplary and that various modifications can be made in construction and arrangement within the scope of the invention as defined in the appended claims.

We claim as our invention:

1. A signal direction indicator comprising:
   (a) two pairs of spiral antenna elements each of said elements being planar, and all of said elements lying in the same plane and having a common axis of rotation;
   (b) the elements of each pair being disposed at an angle of 180° with respect to each other and one pair of elements being disposed at a right angle to said other pair of elements;
   (c) each of said elements having an innermost terminal;
   (d) four square law voltage detectors, each of which has an input terminal connected to a respective one of said innermost terminations, each of said detectors further comprising an output terminal;
   (e) a signal direction indicator comprising a pair of input means and a two-dimensional signal responsive means;
   (d) said signal responsive means being connected to said pair of input means for providing an indication with respect to a first axis of the signal produced by one of said input means and another indication, with respect to a second axis, of the signal produced by the other of said input means;
   (g) each of said pair of input means having a pair of input terminals and subtraction means connected to said terminals for producing a signal representing the difference between the signals applied to said two input terminals; and
   (h) first conductor pair means connected to respective ones of the two of said square law detectors which are connected to the innermost terminations of one of said pairs of antenna elements and to respective input terminals of one of said indicator input means, and second conductor pair means connected to respective one of the output terminals of the other two of said square law detectors and to respective input terminals of said other indicator input means;
   (i) whereby the indication along one axis of said indicator means is proportional to the difference between the outputs of two of said detectors and the indication along the other axis of said indicator means is proportional to the difference between the outputs of the other two of said square law detectors.

2. A device as recited in claim 1 wherein the axis of said indicator signal responsive means are orthogonal.

3. A signal direction indicator comprising:
   (a) a four-element spiral antenna having a circumference which is large enough to permit said antenna to be excited in its first two modes;
   (b) square law signal detecting means having inputs connected to the innermost ends of said antenna elements, said detecting means also comprising output terminals for providing voltages which are proportional to the time-averaged squares of the voltages appearing at said innermost ends of said antenna elements; and
   (c) two-axis indicator means connected to said output terminals for providing an indication along one axis of the difference between the time-averaged squares of the voltages appearing at the innermost ends of two alternate antenna elements.

4. A signal direction indicator comprising:
   (a) a spiral antenna having four identical spiral elements arranged in a single plane and all having a common origin, said elements being evenly distributed around said common origin and each having an innermost termination wherein all of said terminations are equidistant from said common origin, said antenna having a circumference equal to at least two wavelengths of a signal to be received;
   (b) four square-law voltage detectors, each of which has an input connected to a respective one of said innermost terminations and an output at which is produced a signal proportional to the square of the signal appearing at the input; and
   (c) direction indicating means having inputs electrically connected to said detector outputs for providing an indication of the direction of origin of signals received by said antenna.

References Cited by the Examiner

UNITED STATES PATENTS

| 3,013,265 | 12/1961 | Wheeler | 343—113 |
| 3,019,439 | 1/1962 | Reis et al. | 343—895 X |
| 3,175,217 | 3/1965 | Kaiser et al. | 343—113 |

CHESTER L. JUSTUS, *Primary Examiner.*

R. E. BERGER, *Assistant Examiner.*